June 4, 1968 R. APPEMAN 3,386,424
INTERNAL COMBUSTION ENGINES
Filed Dec. 22, 1966 8 Sheets-Sheet 1
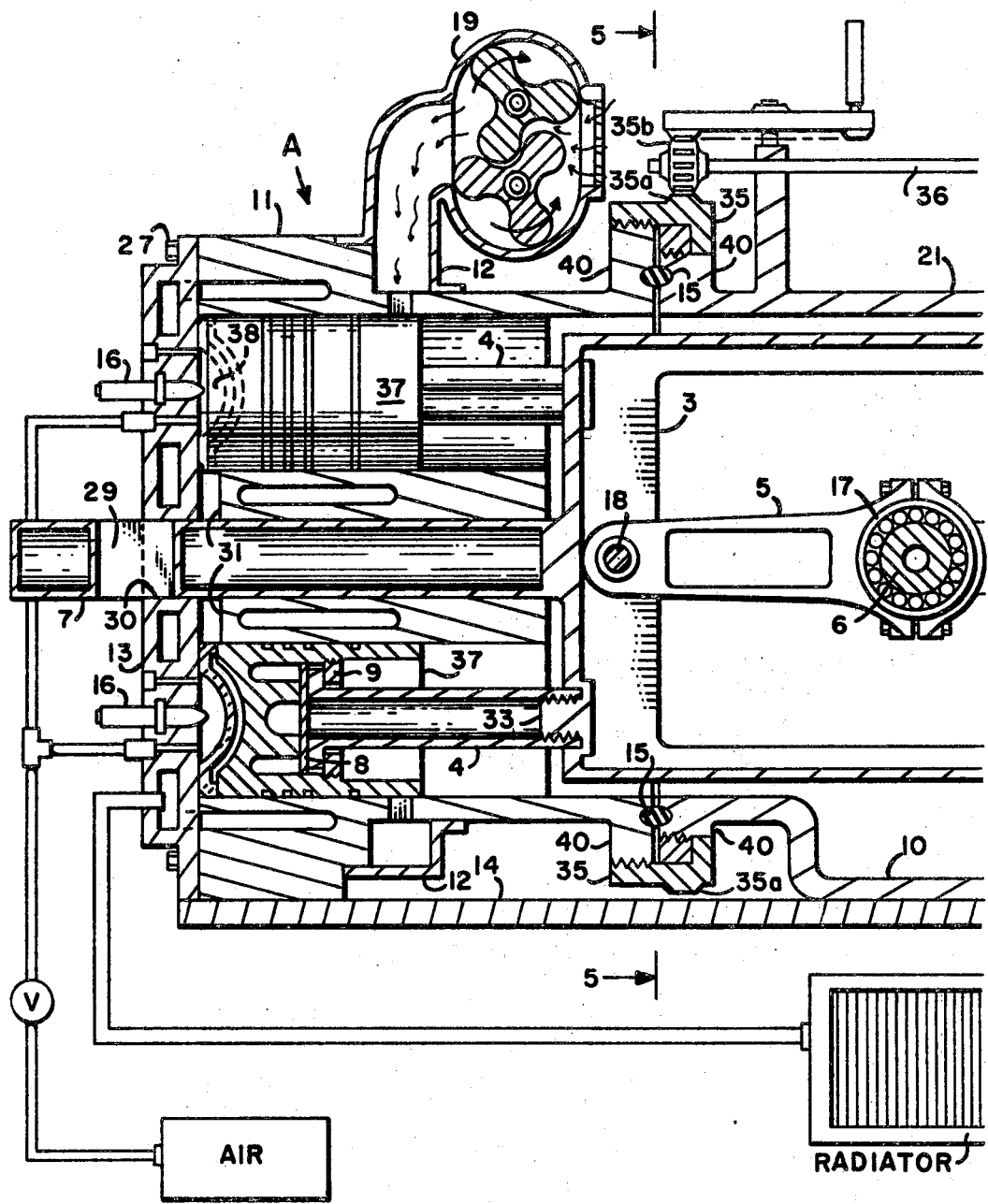
FIG.1
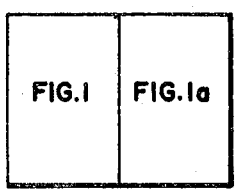
INVENTOR.
RALPH APPEMAN
BY
*Allen and Khromy*
ATTORNEYS

INVENTOR.
RALPH APPEMAN
BY
ATTORNEYS

June 4, 1968  R. APPEMAN  3,386,424
INTERNAL COMBUSTION ENGINES
Filed Dec. 22, 1966  8 Sheets-Sheet 3
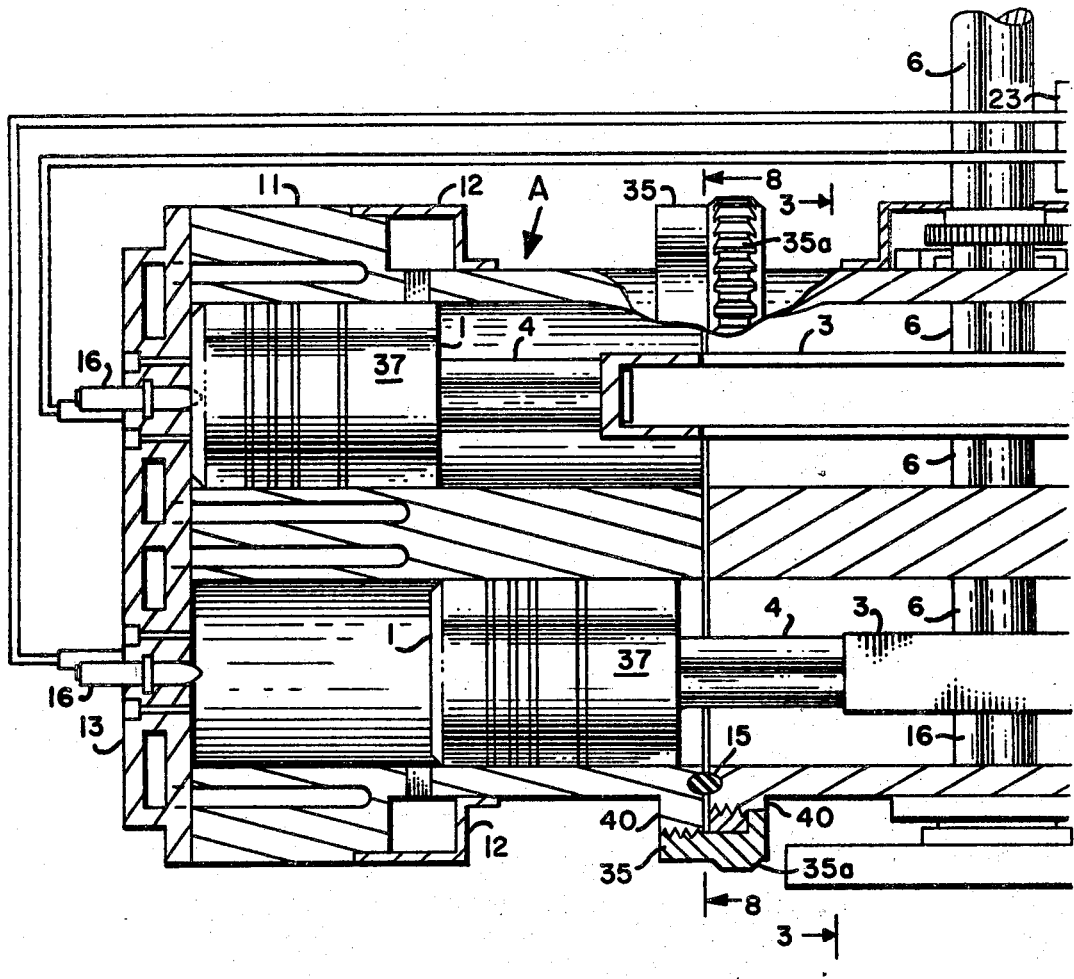
FIG.2
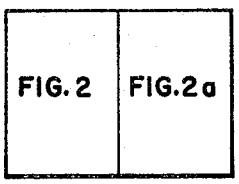
INVENTOR.
RALPH APPEMAN
BY
ATTORNEYS June 4, 1968  R. APPEMAN  3,386,424
INTERNAL COMBUSTION ENGINES
Filed Dec. 22, 1966  8 Sheets-Sheet 5

INVENTOR.
RALPH APPEMAN
BY
*Allen and Gromy*
ATTORNEYS

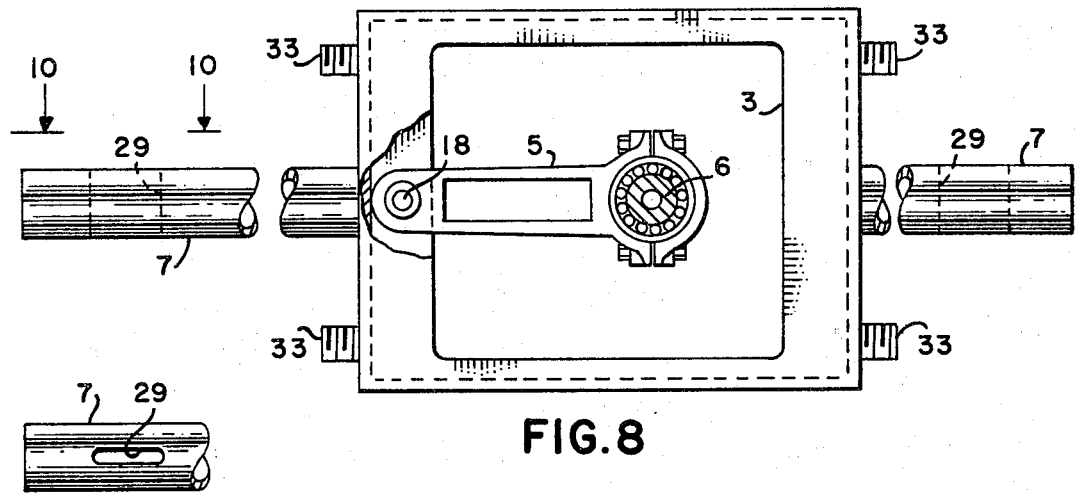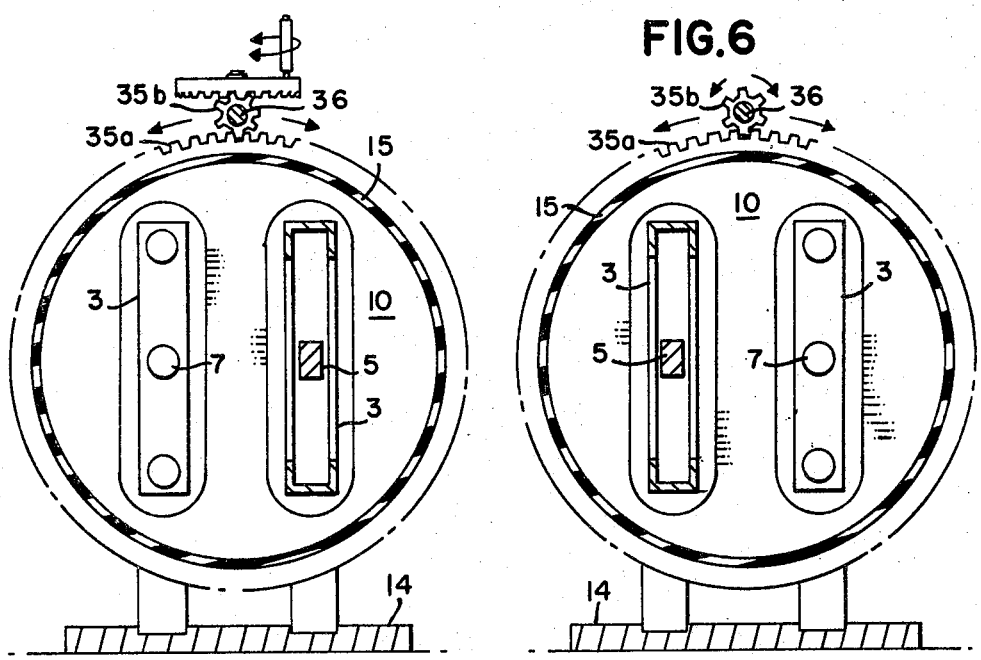

June 4, 1968 R. APPEMAN 3,386,424
INTERNAL COMBUSTION ENGINES
Filed Dec. 22, 1966 8 Sheets-Sheet 7

INVENTOR.
RALPH APPEMAN
BY
*Allen and Hromy*
ATTORNEYS

United States Patent Office 3,386,424
Patented June 4, 1968

3,386,424
INTERNAL COMBUSTION ENGINES
Ralph Appeman, Box 994, San Luis Obispo, Calif. 93401
Continuation-in-part of application Ser. No. 491,510, Sept. 27, 1965. This application Dec. 22, 1966, Ser. No. 604,074
6 Claims. (Cl. 123—48)

ABSTRACT OF THE DISCLOSURE

An internal combustion engine with two horizontally opposed cylinder blocks, each of which is provided with at least two power cylinders, and an additional cylinder positioned between the two power cylinders. The pistons in the power cylinders are provided with piston rods rigidly connected to spaced points on opposite sides of a power frame. Sleeve pistons rigidly connected to opposite sides of the power frame between the piston rods are slidable in the additional cylinders. The axis of the sleeve pistons corresponds to the axis of symmetry of the power frame. The volumes of the compression chambers of the cylinders may be increased or decreased so that the temperature of the compressed fuel may be controlled and operating efficiency of the engine increased.

---

This application is a continuation-in-part of my application Serial No. 491,510 filed September 27, 1965, now abandoned.

This invention relates to internal combustion engines of the two-cycle compression ignition type.

The main object of this invention is to provide an engine structure to produce the long proven functions of the two-cycle principle without the use of spring-set poppet valves, guides, cam-shafts, push-rods, rocker-arms, piston wrist-pins, or internal gears commonly used.

Another object of this invention is to provide an internal combustion engine structure of the said two-cycle type whose design lends itself to rugged durable construction, simple mass production, simple assembly and disassembly and simple servicing, and further, to provide a structure of low mass, compact design to deliver high torque to the shaft at median r.p.m.'s.

Another object of this invention is to provide an internal combustion engine structure with the means to increase or to decrease compression pressures quickly in its cylinder-heads to obtain the optimum in self ignition temperatures as may be indicated for the most complete combustion of variable available fuels; the same as may be used by the adaptation of conventional fuel injector spray systems intended for this purpose.

With the foregoing objects in view together with additional objects and advantages developed in the following specifications, attention is directed to the attached drawings embodying features of the invention, wherein:

FIGS. 1 and 1a together illustrate a longitudinal vertical section of an embodiment of this internal combustion engine, FIG. 1 showing the left hand part of the engine and FIG. 1a showing the right hand part thereof;

FIGS. 2 and 2a together show a horizontal sectional view of this engine taken along the line 2—2 of FIGS. 1 and 1a, FIG. 2 showing the left hand part of the engine and FIG. 2a showing the right hand part thereof;

FIG. 4 is a sectional view taken along the line 4—4 of FIG. 1a;

FIG. 5 is a sectional view taken along the line 5—5 of FIG. 1;

FIG. 6 is a sectional view taken along the line 6—6 of FIG. 1a;

FIG. 7 is a sectional view taken along the line 7—7 of FIG. 1a;

FIG. 8 is a side view of the power frame and sleeve pistons which are partially broken away;

FIG. 9 is a detail view taken along the line 10—10 of FIG. 8;

Figure 1A:
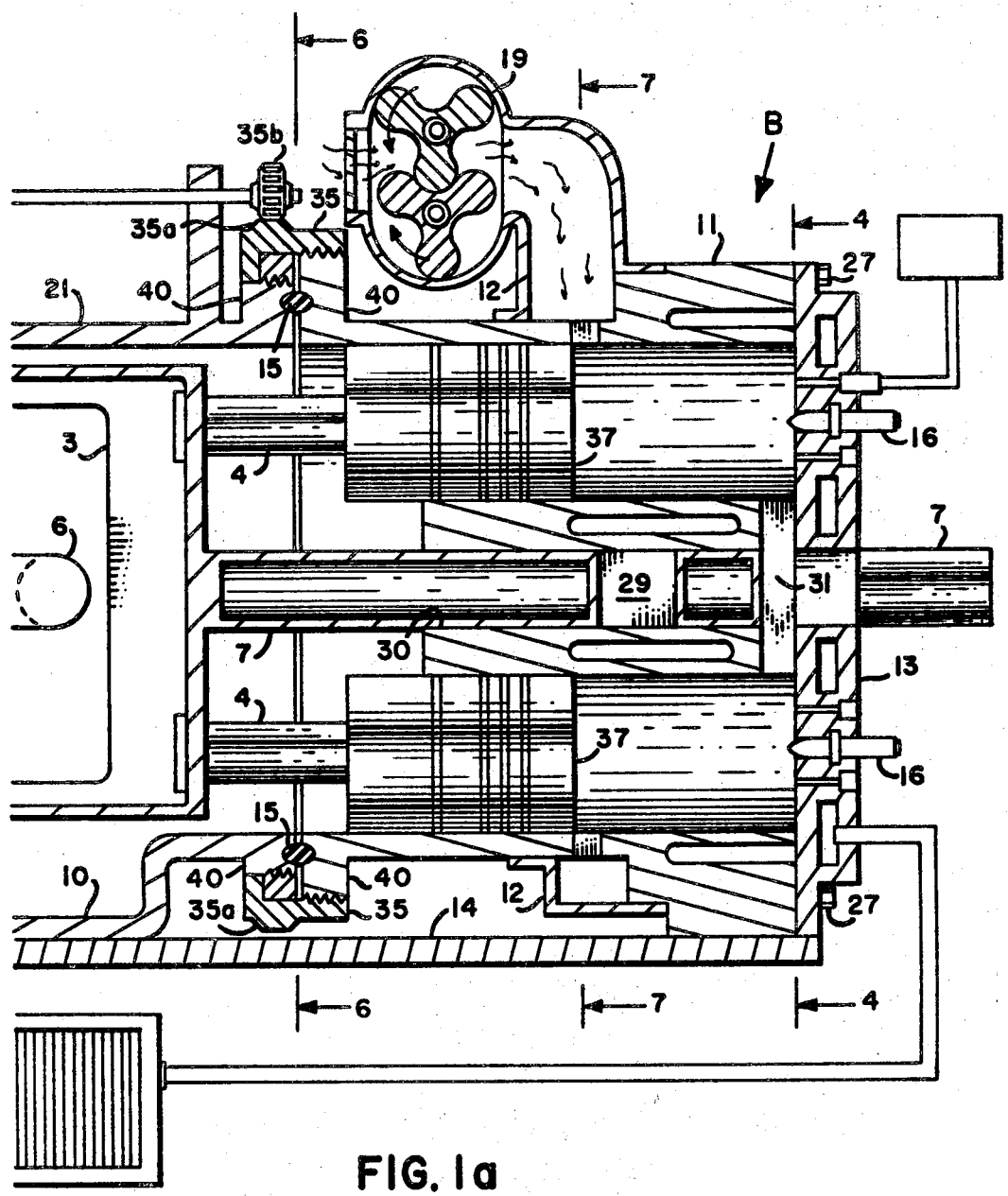

Referring now specifically to the attached drawings of a compression ignition engine made in accord with this invention; FIGS. 1 and 1a taken together show a longitudinal vertical section cut medially through the engine. These views also show a section taken through the rectangular power frame 3, the ends of which are forged into channels facing inward. The upper and lower sides of the power frame may be similarly made into I-beams or tubes as shown by members 2 in FIG. 10; at median point in the opposed ends a hole is bored to receive a gudgeon-pin 18 driven thru the eye of the upper end of a connecting-rod 5 the lower end of which is mounted on a crank-pin of the crank-shaft 6; projecting outward from said median point in the opposed ends in exact axial longitudinal alignment a sleeve piston 7 is forged integral with the said power frame; the outer ends of said sleeve pistons are closed and near the said outer ends a longitudinal vertical slot 29 is provided to form an adit communicating with the openings 31 to the cylinders when this slot is aligned therewith. Hubs 33 projecting outward from the upper and lower outward facing opposed ends of the power frame forged in exact mutual axial longitudinal alignment are threaded to receive their respective tube aluminum piston rods 4.

Figure 3:
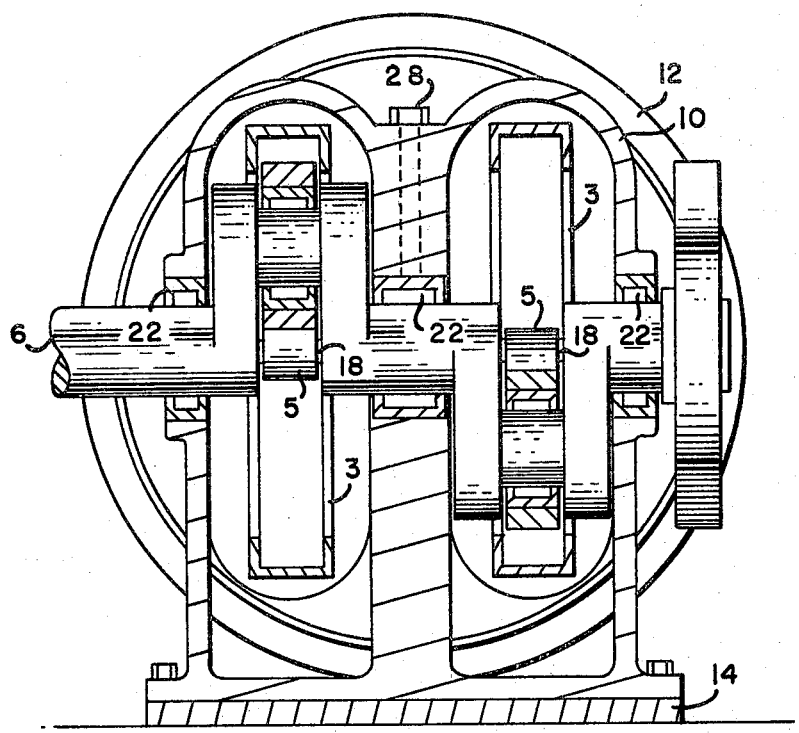
FIG. 3 is a sectional view taken along the line 3—3 of FIG. 2.
Figure 4:
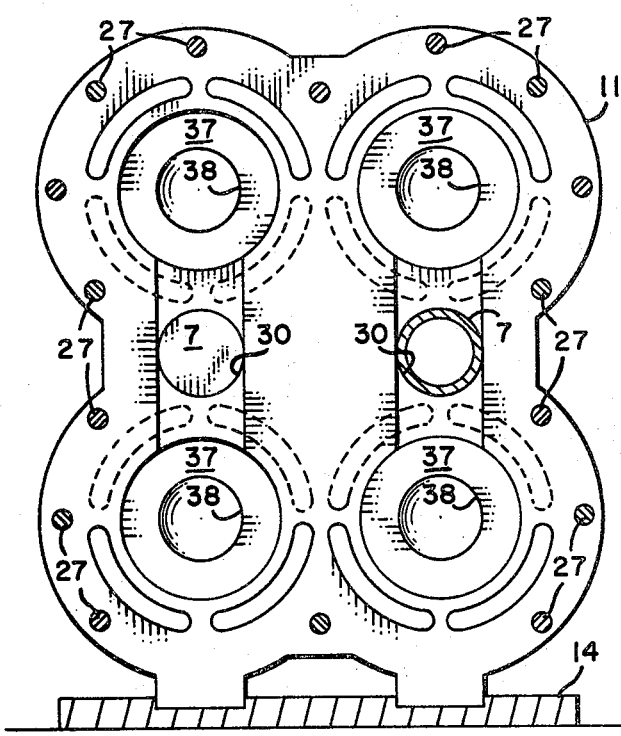
Figure 7:
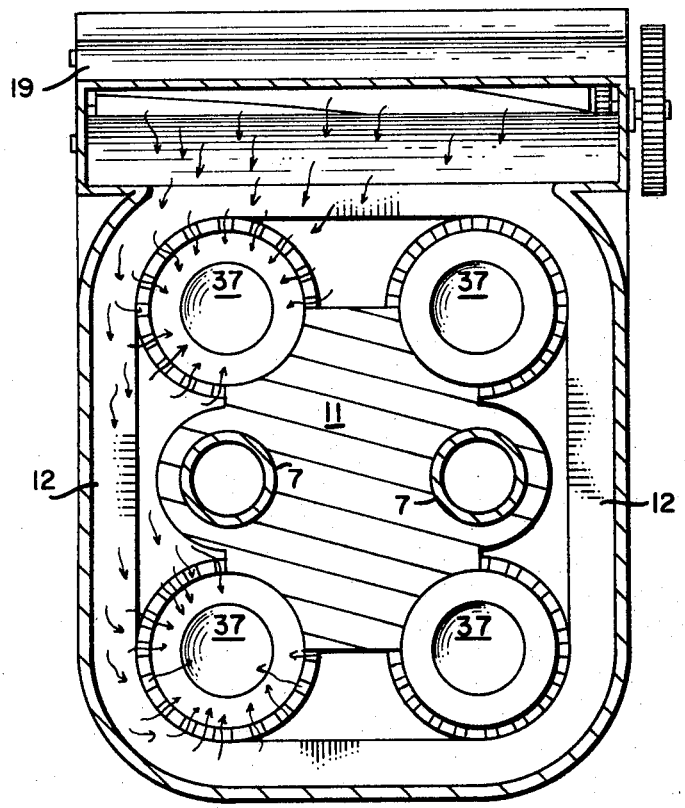
Figure 11:
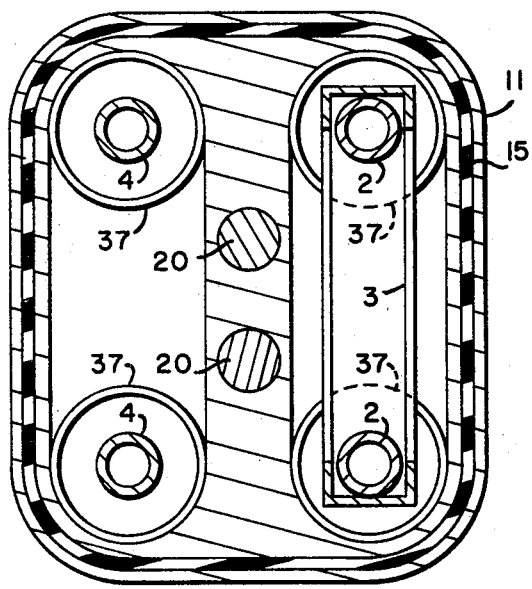
FIG. 11 is a sectional view taken along the line 11—11 of FIG. 10.

FIGS. 1 and 1a show a section cut medially through the long axis of the engine's main components consisting of two identical cylinder-head castings 13, two identical interchangeable cylinder-blocks 11 abutting a central crank-case 10 and 21 at opposed angles of 180 degrees; said cylinder-blocks 11 are bored identically to provide six cylinders in each block all open at both ends; said six cylinders in each block consist of two pairs of jacketed power cylinders as shown in FIGS. 7 and 11, 37 and two service cylinders 30 of lesser diameter centered vertically between each pair of power cylinders 37 thereby to form two pairs of three cylinders in each block. Each of said six cylinders is bored in exact mutual axial parallel longitudinal alignment and spaced relation, as shown in FIG. 4. Flat jacketed cylinder-heads 13 are bolted to said cylinder-blocks 11 close each end of the said and opposed power cylinders: clearance spaces (combustion spaces 38 are recessed in heads of piston 37; holes bored through said flat cylinder-heads in exact mutual axial alignment with said service cylinders 30 accommodate their respective sleeve pistons 7 in reciprocal operation: the third of said main components is a central crank-case casting machined medially and transversely and journaled to mount a short stiff crank-shaft 6 with two throws (crank-pins) at opposed angles of 180 degrees, said two throws are separated by three main roller bearings 22, one in the middle, and one in each side of said crank-case 10, FIG. 3; a connecting-rod 5 is mounted on each throw by conventional means and by a gudgeon-pin 18 through its eye at upper end through said hole bored at median point through end forgings of the power frame 3; obviously, two connecting-rods separated by the middle main bearing are parallel in operating their respective power frames in reciprocating action in the same end of the crank-case, that is, either the A end or the B end. The upper ends of said aluminum piston-rods 4 are forged into external upset flanges, as shown in FIG. 1, machined flat on both their upper and lower sides: aluminum pistons in perfect circles and NOT cam-ground, are threaded around the inside of their skirts and approximate center of gravity to receive the threaded ring 9; the pistons' interior head-supports are also machined flat; a thin circular metal baffle 8 is inserted against said flat head-supports. The thick washer type retainer 9 threaded around its periphery is inserted to surround each piston-rod 4 with ample annular clearance and to engage said threads around the inside of the piston skirt; by means of said retainer 9 all of said flat surfaces (with oil films) are brought into adhesive contact; annular clearance between the inside diameter of said retainer and the outside diameter of the piston-rod 4 allows for expansion-contraction or any misalignment of the power frame. This provides a tight longitudinal assembly simultaneously with easily sliding centralizing movements of the pistons 37 in the plane perpendicular to the reciprocating axis of the power frame 3 as clearly shown in FIG. 1 of the attached drawings.

In an engine structure in its preferred form as in part above specified, two identical power frames 3 each mounted by four power pistons I in opposed pairs and their respective sleeve pistons 7 forged integral therewith in opposed positions; each power frame 3 connected by a gudgeon-pin 18 to a connecting-rod 5 mounted on a crank-pin of the shaft 6 to reciprocally operate as a unit in its respective six cylinders in each of the two opposed cylinder-blocks 11, the "A" block being identified by the connecting rod end of the engine as opposed to its "B" block end; accordingly, as the power frame reaches its TDC (top dead center) in the "A" block it is also at BDC (bottom dead center) in "B" block; and, before TDC is reached by the power frame in either the "A" or "B" blocks, compression pressures become equalized in their respective cylinder heads through and by means of said compartment slot or adit 29 opened between each twin exhaust channel 31 by the said adit in the outward moving sleeve pistons in their respective service cylinders 30; obviously, said adit is closed immediately before timed fuel injection into each twin-head has begun at 25 degrees, more or less, before TDC; accordingly, maximum combustion pressures at TDC in the "A" block occur simultaneouosly with maximum scavenging through the uncovered ports at BDC in "B" block, and vice-versa; therefore, in its preferred form as above specified, two power frames operating two throws off a short stiff shaft combine to deliver effective torque to the shaft through each 360 degrees of crank-angle.

Spaced circular bores are provided to the peripheries in all cylinders 37, as shown in FIG. 7 immediately above the ends of piston-travel at BDC positions. These bores communicate with an air box 12 which is attached to and surrounds both "A" and "B" cylinder-blocks to cover said ports; a commercially available helical type blower 19 gear or chain driven off the shaft at desired multiples of engine speed delivers air into the air box 12 under constant pressure to scavenge the engine; obviously, the power pistons I uncover the ports at BDC simultaneously with the sleeve pistons 7 as they open their respective twin exhaust channels 31 in upper ends of cylinder-blocks thereby to release spent gases under the pressure of freshly injected air from said air boxes 12.

As above specified, the structures of the individual power pistons and piston-rod assemblies provide a tight longitudinal connection with their power frames simultaneously with easily sliding movements of the power pistons along the plane perpendicular to the reciprocating axes of the power frames; therefore, if owing to any misalignment of said power-frames caused by contraction-expansion owing to temperature changes, this invention liberates each individual power-piston to adjust itself along the said plane perpendicular to its reciprocating axis, and by the same means to prevent binding against its cylinder-walls.

Obviously, the purpose of said service cylinders 30 bored in each of said opposed cylinder-blocks to receive their respective sleeve pistons 7 in reciprocating operation is also for the purpose of taking up (absorbing) side thrust: (side thrust in all conventional engines is the resultant force of piston pressure against the connecting-rod crank-angle developing out of round pistons and cylinders, unbalanced ring wear and eventual piston slap) accordingly, side thrust and its cause as above defined is eliminated by the use of the structure as specified herein; each piston is machined into perfect circles, not requiring to be cam-ground as in common practice and eliminating its usual wrist-pin with its resultant cause of torsion, and will, therefore, outwear and outlast any piston ever made: and, further, owing to the absence of side thrust, a long stroke long lever-arm throw is employed with its greater advantage to deliver high torque values to the shaft.

In an engine structure as specified consisting of the said three main components to accommodate their respective power frames in reciprocal operation, each of said components (castings) around their mutual abutting ends is formed into external upset flanges 40 machined into perfect circles and threaded around their peripheries to engage their respective couplings or collars 35; said collars' inside diameters are cut with right threads to mesh with its companion threads cut into periphery of the rounded flanges of the "A" block, and into left threads to engage its companion threads cut into the periphery of the rounded flanges of the "B" block; teeth 35a are cut into the outside diameter of said collars: a long rod 36 journaled longitudinally to the fixed crank case extends to the operator's control wheel; two gears 35b in spaced relation on said rod 36 mesh with the said teeth 35a cut into the outside of said collars to thereby synchronize their rotation: said control wheel may be rotated clock-wise to draw the opposed "A" and "B" blocks closer to the crankcase thereby to decrease the respective clearance (combustion) spaces in the opposite heads to increase compression pressures and temperatures as may be indicated for the optimum combustion of variable available fuels: said control wheel may be rotated counter clock-wise to produce directly reverse results in compression pressures and temperatures: obviously, after four complete similar rotations of said collars actuated by the said rod, the engine's three main components may be disassembled: the said collars being free to rotate in their vertical plane on the crank-case side.

Figure 10:
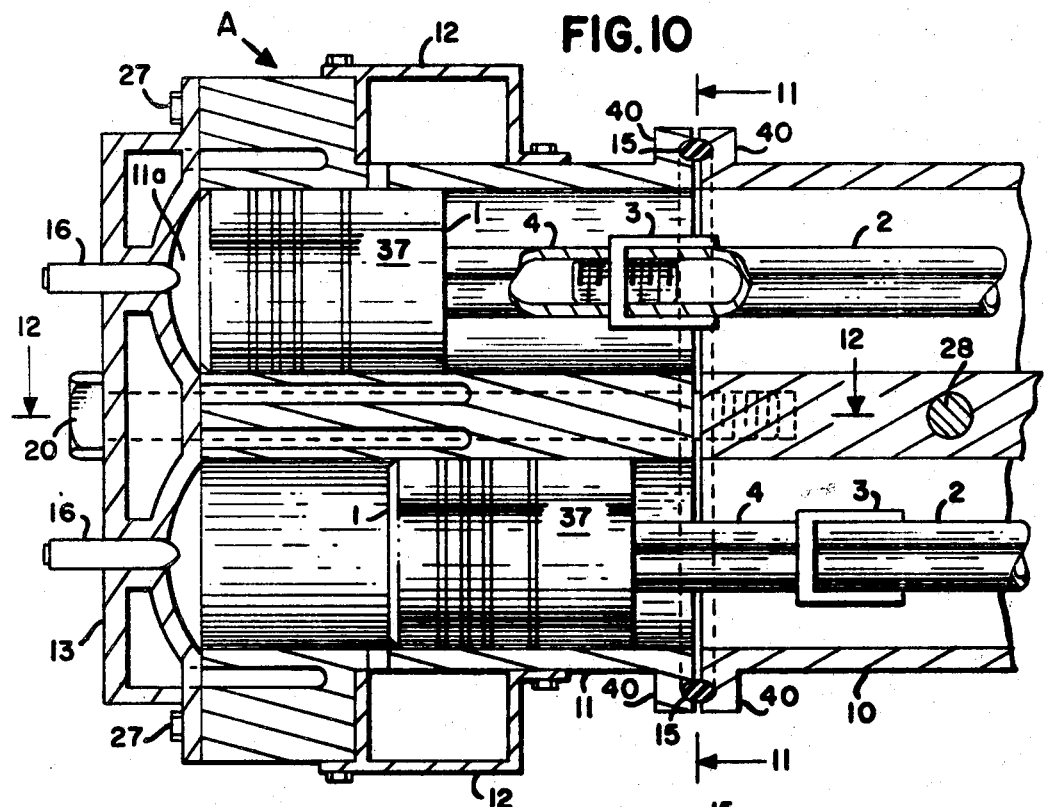
FIG. 10 is a sectional view of one end of this engine showing a modified arrangement for adjusting the volume of the compression clearance in the power cylinders.
Figure 12:
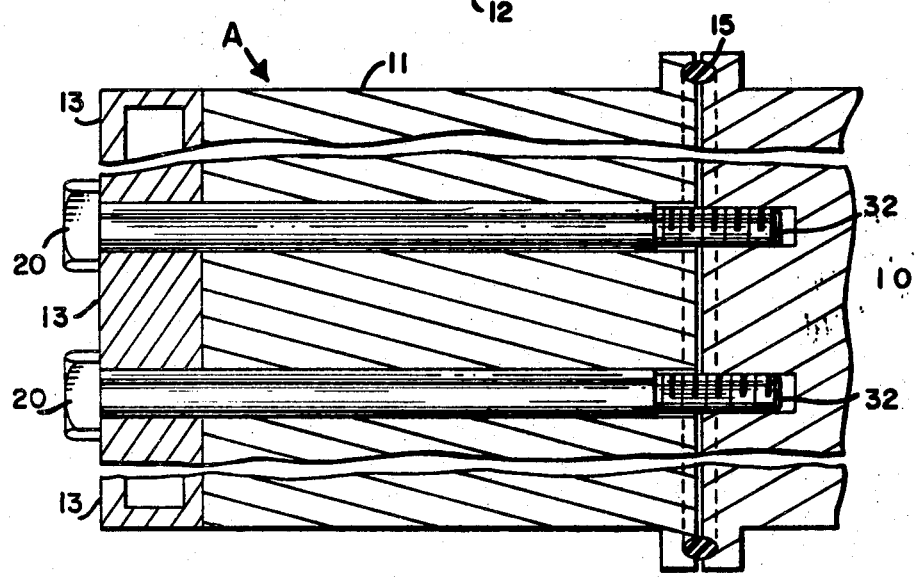
FIG. 12 is a sectional view taken along the line 12—12 of FIG. 10.

A modified arrangement for increasing or decreasing the respective clearance or combustion spaces in the opposite heads of this engine is shown in FIGS. 10, 11 and 12 of the drawings. Only one of the blocks is shown in these views, however, a similar arrangement is provided to the other engine block for increasing or decreasing the clearance spaces therein. In this embodiment two large bolts 20 are positioned in holes formed in the head 13 and block 11 and these bolts are threaded into threaded holes formed in the central member of the crank case 10. The bolts 20 serve to hold the block 11 assembled with the crank case 10. A gasket 15 of suitable resilient material is positioned in grooves formed in the opposing flanges 40 of crank case 10 and block 11. Thus, when the bolts 20 are threaded into the crank case 10 a predetermined distance, they function to compress the gasket 15 and at the same time reduce the clearance space 11a between the end of the pistons and the head 13.

In an engine structure as herein specified, a central crank-case 10 bolted to a bed plate 14 with its ends recessed longitudinally as guides to receive the fore and aft movements of the cylinder-blocks from their opposed positions, the said movements of the opposed blocks being actuated by rotating the synchronized collars 35 to engage or to disengage said blocks and/or to provide the ultimate in compression pressures and temperatures in the heads.

In an engine structure according to the above specifications, maximum combustion pressures against each power-frame begins at TDC (top dead center) alternately at each 180 degrees of crank-angle in "A" and "B" cylinder-blocks: acceleration of the power-frame across the air injection ports in the opposed block continues to beyond the torque peak of its crank-angle to simultaneously build up opposite compression by which means the forces of the power-frame's inertia produce the useful work of said opposite compression toward the bottom of each stroke: whereas, in conventional structures the inertia forces of each piston assembly unit may exceed maximum pressures at 2500 r.p.m. and over and they show that for each unit the side of the crank-pin nearest the crank-shaft center wears the most the same being the result of inertia pressures wasted against crank-pins at bottom of each stroke. Obviously, in this subject engine structure, acceleration of the power frame's mass from one end is cushioned against compression in the opposed end to use up the end forces of its inertia, damp our vibration and give smooth running operating control.

Figure 2A:
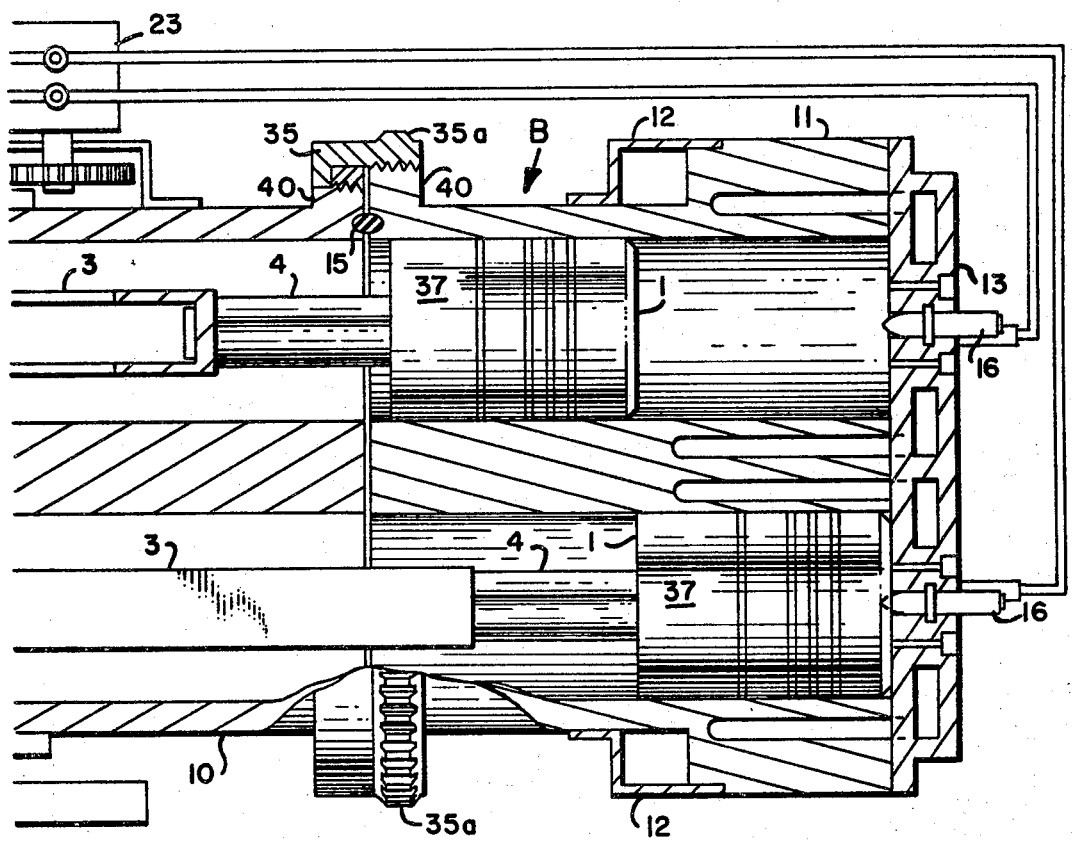

In an engine structure as hereinabove specified, five interior moving parts are employed to operate its eight cylinder system: said moving parts consists of one crank-shaft, two power-frames, and two connecting-rods: each stroke is a power-stroke delivering effective torque to the shaft through 360 degrees of crank-angle: its compression regulator system consisting of ID (inside diameter) threaded and OD (outside diameter) teeth-cut couplings (collars) 35 and control rod 36 geared into said couplings to synchronize their rotation and by means of their inside diameters' reversed threads to simultaneously draw the opposed "A" and "B" cylinder-blocks closer to or farther from the fixed crank-case thereby to provide the optimum compression pressures and temperatures required for the most complete combustion of any kind of fuel: said compression regulator system simultaneously provides a quick assembly or disassembly of the engine's three main components; its sealed interior lubricated by oil mist or spray actuated by an appendage on the power-frame into the sump or by a conventional gear pump: a conventional pump fuel-injector system 23, shown in FIGS. 2 and 2a is gear-driven off the crank shaft 6 and cam-operated to open each pair of hydraulic spray valves simultaneously at 25 degrees, more or less, before TDC, and alternately thereafter at 180 degrees in each of the opposed twin heads: an air bottle and air starting valves or conventional electric system may be used to start the engine: a conventional cooling system is also adaptable to complete the operation of the specified engine structure in accordance with common practice.

While I have here shown and described the structures of this invention, the same may be changed or altered within the scope of the claims which are now desired to be protected by Letters Patent of the United States, they are:

1. In a compression ignition engine, the combination of a cylinder block having a cylinder formed therein, a head attached to one end of said cylinder block to close one end of said cylinder, a piston slidable in said cylinder, a crank shaft, housing supporting said crank shaft, said cylinder having a clearance space therein for the compressed fuel, means feeding the fuel to said clearance space when the piston is in its compression position in the cylinder, means varying the volume of said clearance space during the operation of the engine to obtain optimum compression and operating temperature of the engine fuel, said last mentioned means comprising a threaded ring gear on the outside of said housing holding said cylinder block and said housing assembled, and means moving said threaded ring gear for slidably moving said head and said cylinder block with respect to said housing and independently of the movement of said piston.

2. In a compression ignition engine, the combination of a substantially rectangular power frame, a housing having a central portion and end portions, means attaching said end portions to the opposite ends of said central portion, said end portions each having power cylinders formed therein, cylinder heads attached to the outer ends of said end portions, pistons slidable in said power cylinders, means connecting said pistons to said power frame, means feeding fuel to said power cylinders, said end portions also having additional cylinders disposed between said power cylinders, sleeve pistons slidably positioned in said additional cylinders, said sleeve pistons being rigidly attached to opposite sides of said power frame, said power frame having an axis of symmetry which passes through the longitudinal axis of said sleeve pistons, a gudgeon pin positioned in said power frame with the axis of said pin crossing said axis of symmetry, a crank shaft journaled in the sides of said housing central portion and a connecting rod connected to said power frame by said gudgeon pin, said connecting rod having means connecting it to said crank shaft.

3. In a compression ignition engine, the combination as set forth in claim 2 further characterized in that said means connecting said pistons to said power frame comprises rods fixedly attached to said power frame, said rods having flanges at the outer ends thereof and means clamping said flanges in said pistons, said clamping means permitting limited lateral movement between said pistons and the respective rods to take up misalignment between said pistons and the respective rods.

4. In a compression ignition engine, the combination of a pair of substantially rectangular power frames, a housing having a central portion and end portions, means attaching said end portions to the opposite ends of said central portion, said end portions each having two groups of power cylinders formed therein, the cylinders in each of said groups being parallel, pistons slidable in said power cylinders, means connecting said pistons in one set of opposing groups to one of said power frames, means connecting said pistons in the other set of opposing groups to the other of said power frames, means feeding fuel to said power cylinders, said end portions also having additional cylinders disposed between said power cylinders, sleeve pistons slidably positioned in said additional cylinders, said sleeve pistons being rigidly attached to opposite sides of said power frame, each of said power frames having an axis of symmetry which passes through the longitudinal axis of said sleeve pistons attached thereto, a gudgeon pin positioned in each of said power frames with the axis of said pin crossing said axis of symmetry of the associated power, a crank shaft journaled in the sides of said housing central portion and connecting rods connected to said power frames by the gudgeon pin associated therewith said connecting rods having means connecting them to said crank shaft.

5. In a compression ignition engine, the combination as set forth in claim 4 further characterized in that each of said housing end portions have two groups of power cylinders formed therein and each of said groups including two parallel cylinders with one of said additional cylinders positioned therebetween, the pistons in said parallel cylinders working in unison.

6. In a compression ignition engine, the combination as set forth in claim 5 further characterized in that the pistons in a set of opposing groups of said cylinders are connected by piston rods to one power frame, and the pistons in another set of opposing groups of said cylinders are connected by additional piston rods to another power frame.

References Cited

UNITED STATES PATENTS

| | | | |
|---|---|---|---|
| 1,090,647 | 3/1914 | Pitts | 123—53 |
| 1,794,829 | 3/1931 | Burnett | 123—53 |
| 2,302,851 | 11/1942 | Geiser | 123—53 |
| 673,259 | 4/1901 | Hautier | 123—48 |
| 756,011 | 3/1904 | Fitzgerald | 123—48 |
| 1,792,201 | 2/1931 | Treiber | 123—48 |
| 1,909,729 | 5/1933 | Southwick | 123—56 |
| 3,209,736 | 10/1965 | Witzky | 123—48 |

FOREIGN PATENTS

| | | |
|---|---|---|
| 688,784 | 3/1940 | Germany. |
| 502,727 | 3/1939 | Great Britain. |
| 661,029 | 11/1951 | Great Britain. |

WENDELL E. BURNS, *Primary Examiner.*

MARK NEWMAN *Examiner.*